(12) United States Patent
Ye et al.

(10) Patent No.: US 8,793,393 B2
(45) Date of Patent: Jul. 29, 2014

(54) VIDEO PROCESSING DEVICE, VIDEO SERVER, CLIENT DEVICE, AND VIDEO CLIENT-SERVER SYSTEM WITH LOW LATENCY THEREOF

(75) Inventors: Zhou Ye, Foster City, CA (US); Wenxiang Dai, Taipei (TW); Ying-Ko Lu, Taoyuan County (TW); Yi-Hong Hsu, New Taipei (TW)

(73) Assignee: Bluespace Corporation, Apia (WS)

( * ) Notice: Subject to any disclaimer, the term of this patent is extended or adjusted under 35 U.S.C. 154(b) by 62 days.

(21) Appl. No.: 13/303,150

(22) Filed: Nov. 23, 2011

(65) Prior Publication Data

US 2013/0132510 A1    May 23, 2013

(51) Int. Cl.
*G06F 15/16* (2006.01)
(52) U.S. Cl.
USPC ...................... 709/232; 709/217; 375/240.24
(58) Field of Classification Search
CPC ........... H04L 1/1838; H04N 19/00278; H04N 19/00145; H04N 19/00266; H04N 7/26335; H04N 19/00369
USPC .......................................... 709/217; 375/240
See application file for complete search history.

(56) References Cited

U.S. PATENT DOCUMENTS

| | | | | |
|---|---|---|---|---|
| 5,991,443 A * | 11/1999 | Gallery et al. | ................. | 382/232 |
| 6,542,549 B1 * | 4/2003 | Tan et al. | ................. | 375/240.26 |
| 8,218,642 B2 * | 7/2012 | Gao et al. | ................. | 375/240.16 |
| 8,319,781 B2 * | 11/2012 | Westerhoff et al. | ........... | 345/502 |
| 2003/0016753 A1* | 1/2003 | Kim et al. | ................. | 375/240.21 |
| 2006/0126728 A1* | 6/2006 | Yu et al. | ................... | 375/240.03 |
| 2007/0120711 A1* | 5/2007 | Hu et al. | ......................... | 341/50 |
| 2007/0217506 A1* | 9/2007 | Yang et al. | ................ | 375/240.03 |
| 2007/0230586 A1* | 10/2007 | Shen et al. | ................ | 375/240.26 |
| 2008/0151997 A1* | 6/2008 | Oguz | ........................ | 375/240.02 |
| 2008/0151998 A1* | 6/2008 | He | ............................ | 375/240.03 |
| 2011/0317762 A1* | 12/2011 | Sankaran | ................. | 375/240.13 |
| 2012/0224641 A1* | 9/2012 | Haberman et al. | ........ | 375/240.24 |
| 2012/0260015 A1* | 10/2012 | Gay et al. | ....................... | 710/301 |
| 2013/0003844 A1* | 1/2013 | Duenas et al. | ........... | 375/240.16 |

* cited by examiner

*Primary Examiner* — Patrice Winder
*Assistant Examiner* — Eyob Hagos
(74) *Attorney, Agent, or Firm* — Ding Yu Tan

(57) ABSTRACT

A video processing device providing multi-channel encoding with low latency is provided. The video processing device can be applied to a video server to perform video compression on game graphics for cloud gaming. With multi-channel encoding with low latency, the video server can provide compressed video streams to a variety of client devices with low latency. As a result, the users can obtain high gaming interactivity and fine entertainment in cloud gaming.

8 Claims, 6 Drawing Sheets

VIDEO PROCESSING DEVICE, VIDEO SERVER, CLIENT DEVICE, AND VIDEO CLIENT-SERVER SYSTEM WITH LOW LATENCY THEREOF

BACKGROUND OF THE INVENTION

1. Field of the Invention

The present invention relates to cloud computing, and more particularly to a video client-server system, a client device, a video server, and a video processing device for achieving low latency cloud gaming.

2. Description of the Prior Art

Cloud computing is to use delivery of computing as a service rather than a product, whereby shared resources, software, and information are provided to computers and other devices as a utility over a network (typically the Internet). There are a variety of applications based on the cloud computing, one of which is cloud gaming. Cloud gaming is a type of online gaming that allows direct and on-demand streaming of games onto a computer through the use of a thin client, in which the actual gaming program code and data are hosted on a gaming service provider's server. The game is streamed as compressed digital video and audio directly to the client over a broadband network. This allows the user to access games without the need of a game console and significantly reduces the cost of the hardware platform for an end user. When the user presses the button or inputs control commands, the user's input will be transmitted directly to the server, where they are recorded. Accordingly, the server sends back the gaming response corresponding to the user's input. With cloud gaming, gaming code processing and video rendering are done at server-side. Even though the user does not actually own a certain hardware platform, cloud gaming still allows the user to play game applications of different game platforms, such as PlayStation®, XBOX®, Wii®, PC, iOS®, Android®, and so on.

Unfortunately, there are some factors that limit cloud gaming, one of which is latency. Latency is a very important factor for cloud gaming, since some types of games endures very low latency, such as action game, racing game and sport game. For these games, low latency is absolutely necessary since the user has to exactly control the timings of gaming actions occurred in these games. If the user cannot instantly receive the gaming response due to latency, it may cause the user to perform poor timing control in the game, such that the user cannot do well in these games and will feel unsatisfied with the gaming result. Finally, the user will get a poor experience upon cloud gaming.

The latency may be affected by the network quality and/or processing time of the server side and/or the client side. Since cloud gaming streams the game graphic as digital compressed video, the processing time is also determined according to the time required to compress video in the server and decompress video in the client device. From this point of view, the video compression algorithms used for generating the compressed video stream plays an important role in cloud gaming. However, most of video compression algorithms have tradeoffs between high data rates and high latency. For example, a conventional H.264/MPEG-4 AVC algorithm may be able to generate a high quality compressed video stream with a relatively low data rate, but it inevitably raises the latency due to its complicated computation. On the contrary, Motion JPEG algorithm that has less complicated computations can lead to low latency, but it disadvantageously raises the data rate. High data date causes the network quality to be more important. However, since the network quality is mostly related to the Internet Service Provider (ISP), it will make the latency more unpredictable and uncontrollable. In view of above, a video compression technique that can effectively reduce the latency without disadvantageously raising the data rate is necessary for cloud gaming.

SUMMARY OF THE INVENTION

With this in mind, it is one objective of the present invention to provide a video processing device for encoding a video frame with low latency.

It is one objective of the present invention to provide a video server with low latency, which can provide a compressed video stream regarding the execution of the game application with low latency.

It is one objective of the present invention to provide a video client-server system with low latency, which can provide a faster gaming response to a user, thus preventing the users from being affected by lag or latency problems to achieve high gaming interactivity and fine entertainment.

According to one exemplary embodiment of the present invention, a video processing device is provided. The video processing device comprises: an expansion card interface, a controller, and an encoder. The expansion card interface is utilized for providing a multi-channel data transfer. The controller is utilized for performing direct memory access (DMA) function to access a video raw data from a video memory via the expansion card interface. The encoder is coupled to the controller, and is utilized for encoding the video raw data to generate a compressed video stream based on slices, wherein each slice comprises at least one macroblock row. Herein the video raw data comprises a plurality of video frames, each video frame is divided into M×N macroblocks, and each macroblock row comprises n macroblocks, where n is at most N.

According to another exemplary embodiment of the present invention, a video server is provided. The video server comprises: a graphic processing unit (GPU), a video memory, and a video processing device. The GPU is utilized for generating a video raw data. The video memory is coupled to the GPU, and is utilized for storing the video raw data. The video processing device comprises: an expansion card interface, a controller, and an encoder. The expansion card interface is utilized for providing a multi-channel data transfer. The controller is utilized for performing direct memory access (DMA) function to access the video raw data from the video memory via the expansion card interface. The encoder is coupled to the controller, and is utilized for encoding the video raw data to generate a compressed video stream based on slices, wherein each slice comprises at least one macroblock row. The video raw data comprises a plurality of video frame, and each video frame is divided into M×N macroblocks, and each macroblock row comprises n macroblocks, where n is at most N.

According to still another exemplary embodiment of the present invention, a client device is provided. The client device comprises a decoder and a buffer. The decoder is utilized for decoding a compressed video stream to generate a decompressed video data, wherein the decompressed video data comprises a slice of a video frame and the slice comprises at least one macroblock row. The buffer is utilized for buffering a plurality of continuous macroblocks according to a clock frequency of the decoder. In addition, the video frame is divided into M×N macroblocks, and each macroblock row comprises n macroblocks, where n is at most N.

According to yet another exemplary embodiment of the present invention, a video client-server system is provided.

The video client-server system comprises: a video server and a client device. The video server comprises: a graphic processing unit (GPU), a video memory, and a video processing device. The GPU is utilized for generating a video raw data. The video memory is coupled to the GPU, and is utilized for storing the video raw data. The video processing device comprises: an expansion card interface, a controller, and an encoder. The expansion card interface is utilized for providing a multi-channel data transfer. The controller is utilized for performing direct memory access (DMA) function to access the video raw data from the video memory via the expansion card interface. The encoder is coupled to the controller, and is utilized for encoding the video raw data to generate a compressed video stream based on slices, wherein each slice comprises at least one macroblock row. The video raw data comprises a plurality of video frame, each video frame is divided into M×N macroblocks, and each macroblock row comprises n macroblocks, where n is at most N. The client device comprises a decoder and a buffer. The decoder is utilized for decoding the compressed video stream to generate a decompressed video data, wherein the decompressed video data comprises a slice of the video frame. The buffer is arranged for buffering a plurality of continuous macroblocks according to a clock frequency of the decoder.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
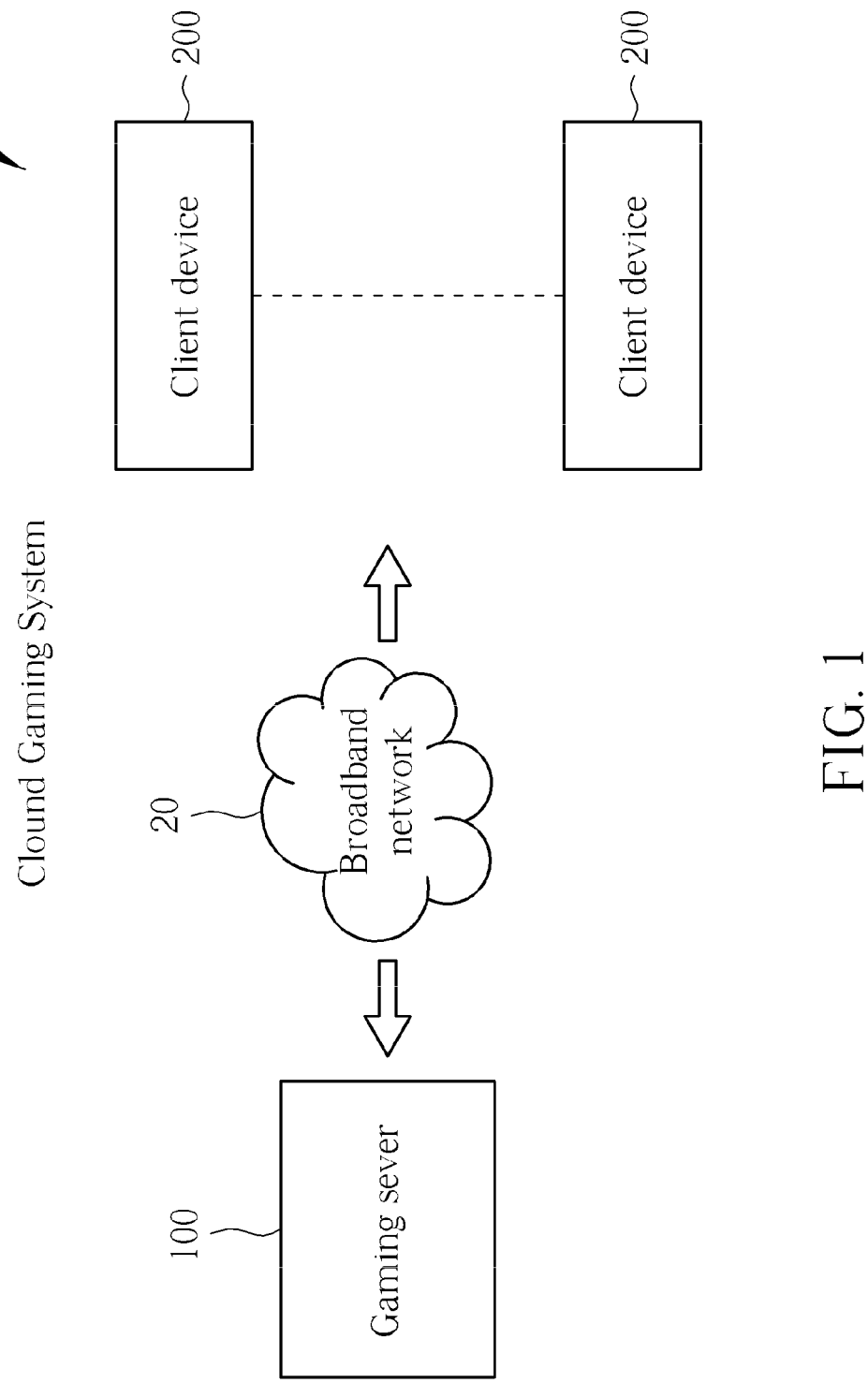
FIG. 1 illustrates a cloud gaming system according to one exemplary embodiment of the present invention.

Please refer to FIG. 1, where a schematic drawing of a cloud gaming system according to one exemplary embodiment of the present invention is illustrated. As shown, the cloud gaming system 10 includes a gaming server 100 and at least one client device 200. The gaming server 110 communicates with the client device 200 over a broadband network 20. In accordance with various embodiment of the present invention, the broadband network 20 may be a wide area network (WAN), a local area network (LAN), or any other types of networks, and the present invention is not limited to this only.

Figure 2:
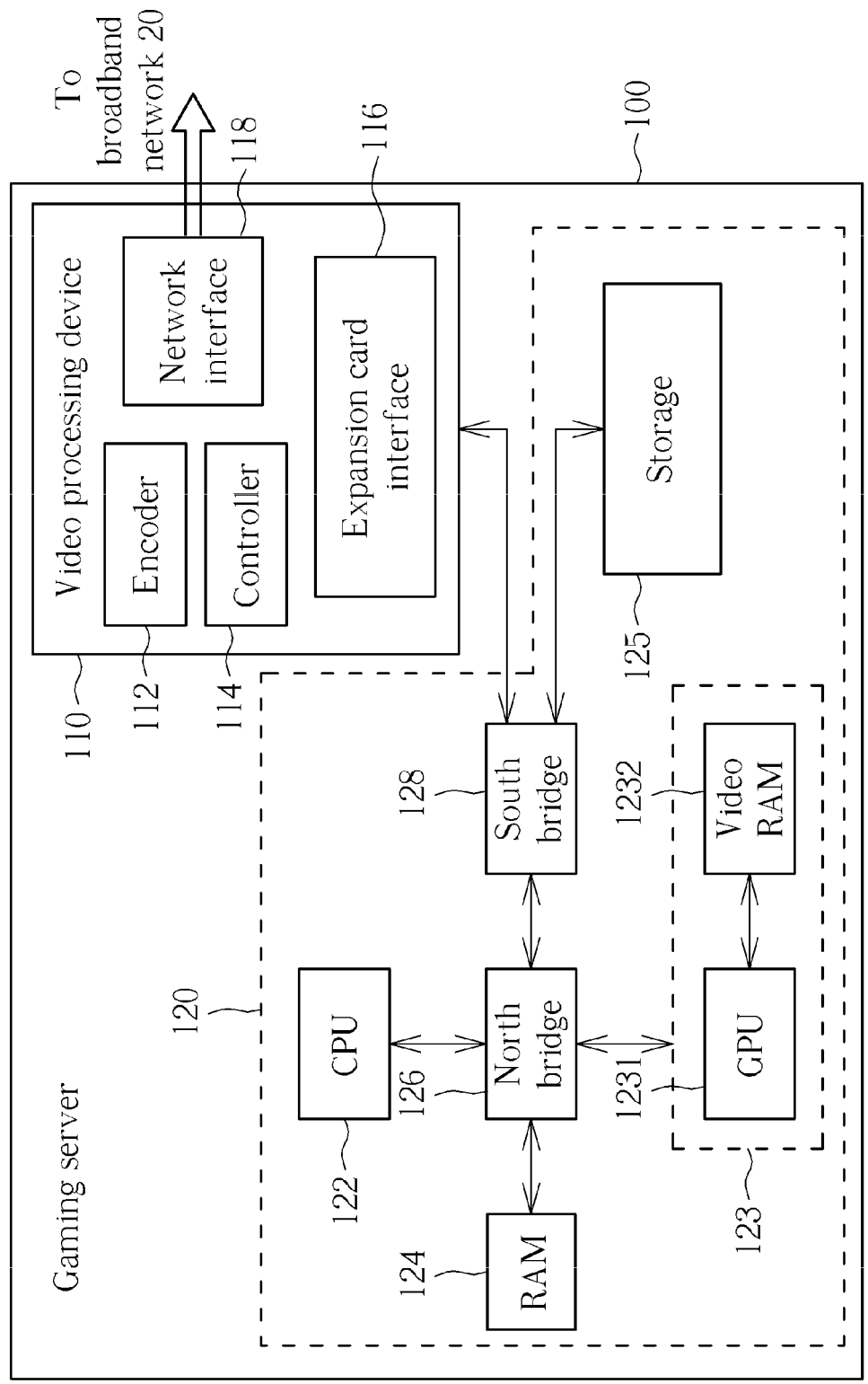
FIG. 2 illustrates a block diagram of a gaming server according to one exemplary embodiment of the present invention.

With reference to FIG. 2, a block diagram of the gaming server 100 is illustrated according to one exemplary embodiment of the present invention. The gaming server 100 includes an inventive video processing device 110 and a main system 120. The main system 120 executes a game application depending on user's demand. A central processing unit (CPU) 122 executes a game application stored in storage 125. The storage 125 may store a variety of game applications and the CPU 122 may execute one or more game applications stored therein based on requests of one or more client device 200 that accesses the gaming server 100. In accordance with various embodiments of the present invention, the CPU 122 may be any type of high performance CPU, such as multi-core processors; and the storage 125 may be a HDD or a RAID system (with any possible RAID level). The CPU 122 loads gaming program codes and related data of game applications from the storage 125, with the help of the north bridge 126 and the south bridge 128. When executing the game application, the CPU 122 stores some codes and data into RAM 124. A graphic subsystem 123 is utilized for executing computations related to game graphic. The graphic subsystem 123 includes a graphic processing unit (GPU) 1231 and a video RAM 1232. In order to generate high quality 2D/3D graphics, the GPU 1231 performs a variety of operations according to commands issued by the CPU 122, including geometric calculation, shading, texture mapping, and aliasing. As a result, the graphic subsystem 123 generates game graphics corresponding to the execution of the game application. The game graphics are generally computed on a frame-by-frame basis. Generated video frame will be stored into video RAM 1232 of the graphic subsystem 123. As the gaming server 100 may simultaneously provide cloud gaming service to different client devices 200, the graphic subsystem 123 needs to perform calculation related to game graphics corresponding to different game applications depending on user's demand, and the Video RAM 1232 needs to store these graphics (i.e. video frames). In view of above, the allocation of the video RAM 1232 is important. According to various embodiments of the present invention, the video RAM 1232 can be segmented into multiple areas. Each segmented area is assigned to one client device 200 and is utilized for storing video raw data corresponding to a certain game application, wherein the video raw data includes video frames based on the execution of the certain game application. The number of the segmented areas is related to the number of the client devices 200 that are currently accessed the gaming server 100. Further, the size of the segmented area depends on a display resolution required by the client device 200. For example, if the client device 200 requires a higher display resolution (e.g. 1080p), the size of the segmented area assigned to the client device 200 will be larger than the size of the segmented area with lower resolution (e.g. 480p). For each client device 200, the Video RAM 1232 is visualized as a dedicated video RAM and different addresses of the Video RAM 1232 will be assigned to different client devices 200.

The video processing device 110 is utilized for generating compressed video stream and for streaming it out to one or more client devices 200. The video processing device 110 comprises an encoder 112, a controller 114, a computer expansion card interface 116 and a network interface 118. The main purpose of the video processing device 110 is to encode/compress the video raw data stored in the video RAM 1232. Therefore, the data size of the video frames can be reduced, which allows the video frames to be suitable for network transmission. The video raw data is loaded from the video RAM 1232 through a high-speed bus between the main system 120 and the video processing device 110. To lower the latency, the high bus may be a PCI Express (Peripheral Component Interconnect Express) bus with a 16× speed (i.e., PCI-E ×16) according to one embodiment of the present invention. Accordingly, the computer expansion card interface 116 will be a PCI-E ×16 interface. With the high-speed interface (i.e., computer expansion card interface 116), it allows the video processing device 110 to perform multi-channel encoding, such that the gaming server 100 can simultaneously execute multiple game applications and stream out the compressed video streams for multiple client devices 200, respectively. The computer expansion card interface 116 can provide extremely large bandwidth, which allows the video raw data dedicated to different client devices 200 to be transferred from different segmented areas of the video RAM 1232 to the encoder 112 with very low latency. For example, assuming that the computer expansion card interface 116 is PCI-E 16×, it will support up to a transmission bandwidth of 40 Gbps. On the other hand, if each client device 200 requires a display resolution and a frame rate of 1080p/30 fps, it requires a transmission bandwidth of 2.5 Gbps. In view of above, with a PCI-E ×16 interface 116, the encoder 112 is allowed to perform at most 16-channel encoding. However, in accordance with various embodiments of the present invention, the encoder 112 can support to more channels if the client device 200 requires lower resolution or lower frame rate (e.g. 720p/30 fps, 480p/30 fps).

The network interface 118 is coupled to the broadband network 20 and utilized for streaming out the compressed video streams to one or more client devices 200 through the broadband network 20. In particular, the network interface 118 can packetize the compress video streams based on TCP or UDP protocols, and then stream out the compressed video stream in form of TCP or UDP packets. In accordance with various embodiment of the present invention, the network interface 118 may be replaced by other network interface inside the gaming server 100. That is to say, the compressed video stream will be sent back to the main system 120, and a network interface (not shown) of the main system 120 will packetize the compress video streams based on TCP or UDP protocols and stream out TCP or UDP packets.

Figure 3:
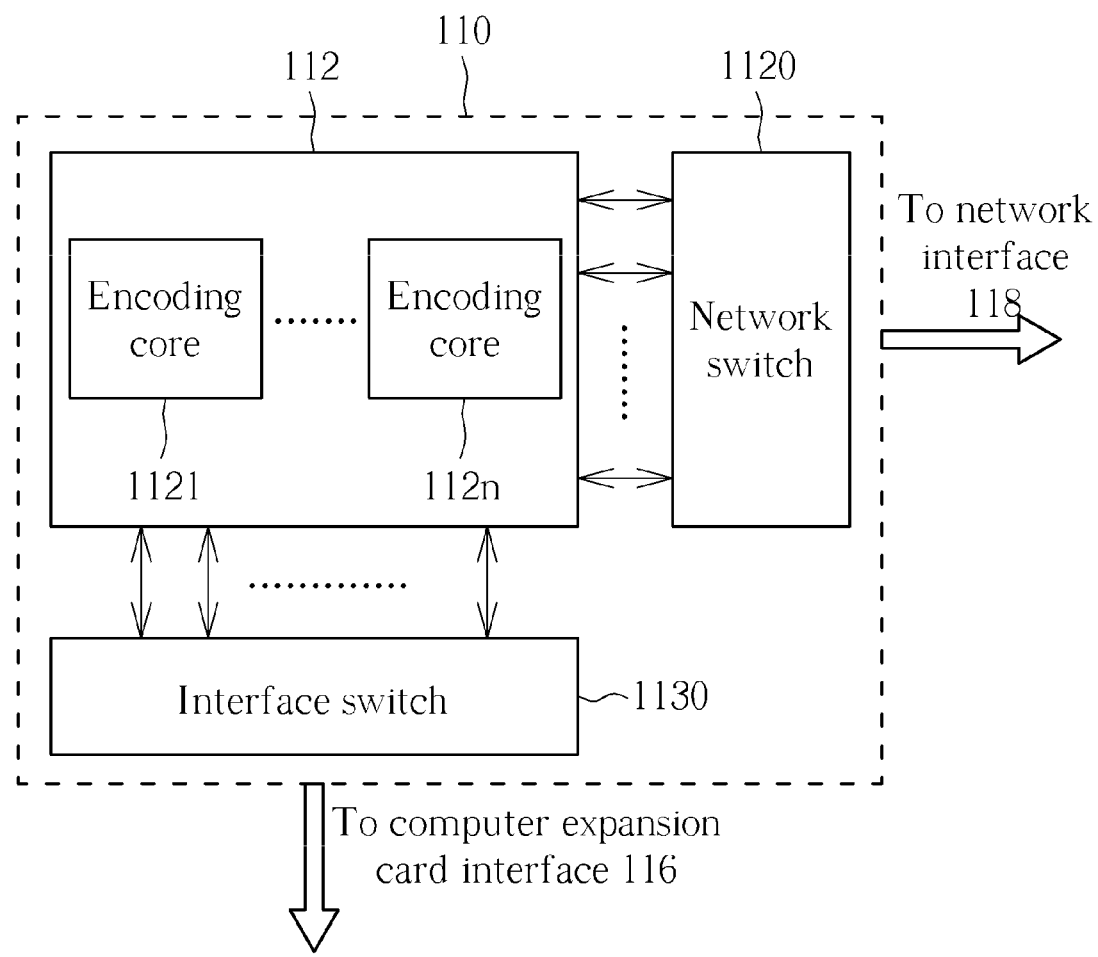
FIG. 3 illustrates a detailed block diagram of an encoder of the gaming server shown in FIG. 2 according to one exemplary embodiment to the present invention.
Figure 4:
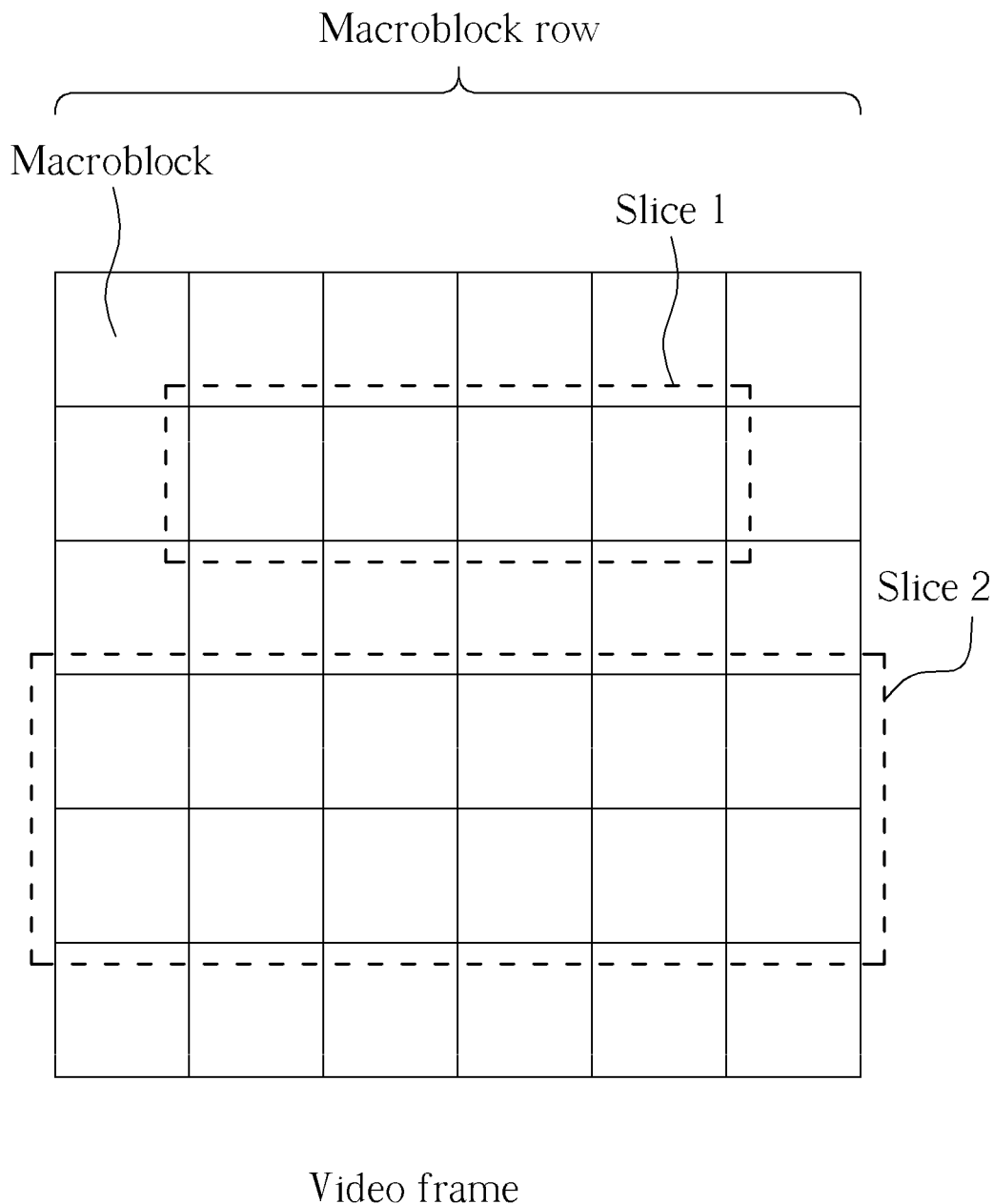
FIG. 4 illustrates the segmentation of a video frame.

As mentioned above, the encoder 112 can support multi-channel encoding, and a detailed block diagram is illustrated in FIG. 3. Each encoding channel can be used to serve the request of at least one client device 200. To accomplish the multi-channel encoding, the encoder 112 includes a plurality of encoding core 1121-112n. Each encoding core 1121-112n is employed for encoding a video frame related to execution of at least one game application depending on certain client's demand. In accordance with various embodiments of the present invention, the encoding cores 1121-112n may be implemented in ways of field programmable gate array (FPGA), digital signal processor (DSP) or hardware circuits. The encoding cores 1121-112n can in parallel encode different video frames related to different game applications based on different clients' demand, respectively. Each encoding core 1121-112n encodes a video frame based on MPEG-4 algorithm, and the compressed video stream is generated based on slices. A video frame can be segmented as different size of regions, which can be seen from FIG. 4. In particular, each video frame of the video raw data comprises at least one slice, each slice comprises at least one macroblock row, and each macroblock row comprises a plurality of macroblocks. In accordance with various embodiment of the present invention, the slice may comprise different numbers of macroblock rows (e.g. Slice 1 and Slice 2), and the macroblock row may comprise different numbers of macroblocks. In other words, the size of the slice and the macroblock row can be configurable to meet different requirements. With the encoding based on slices, the encoding core 1121-112n can encode a video frame with lower latency, because the processing time required by encoding a whole video frame is commonly much longer than the processing time required by encoding a slice of the whole video frame. That is, when the compressed video stream is generated slice by slice (which comprises one or more macroblock rows), the latency of the encoder 112 will be significantly reduced.

Figure 5:
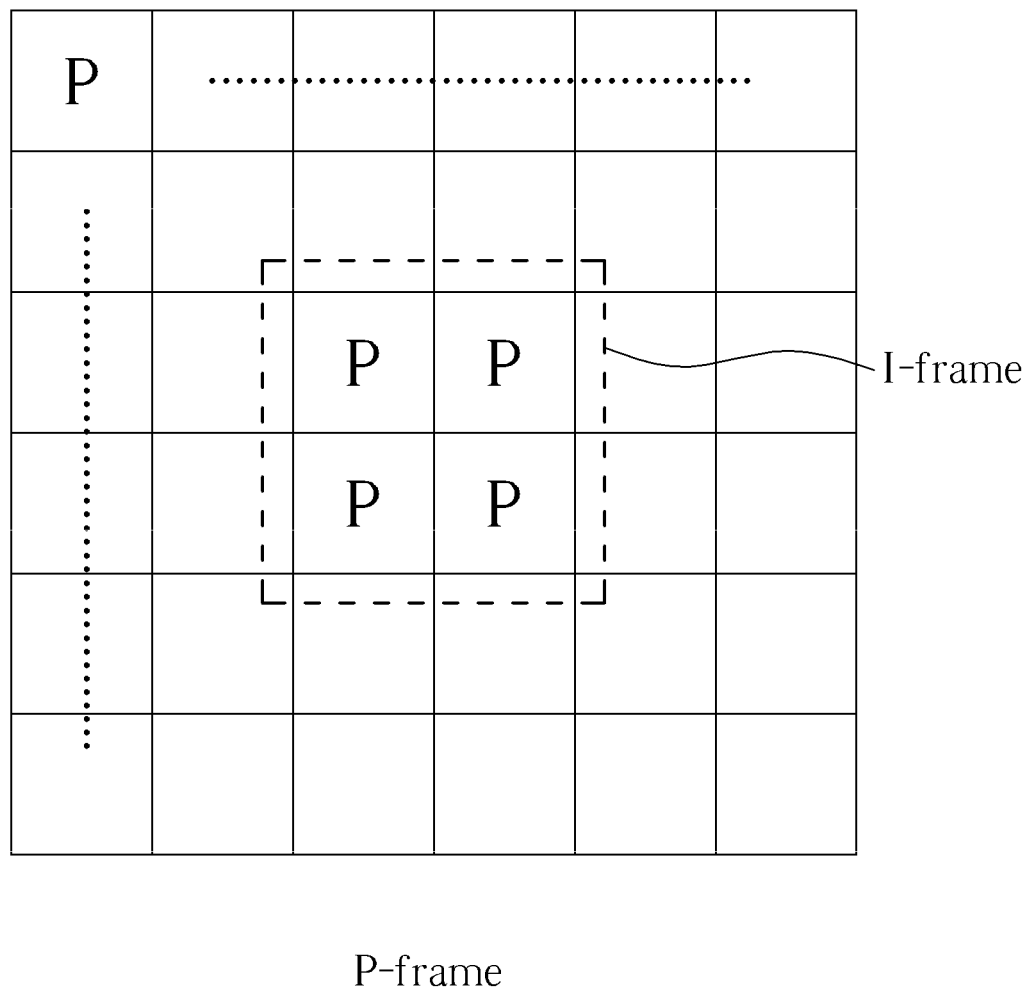
FIG. 5 illustrates a compression technique used in the encoding core shown in FIG. 3 according to one exemplary embodiment to the present invention.

The encoding cores 1121-112n perform video compression based on MPEG-4 algorithm, which has advantages of high compression ratios. Traditional MPEG-4 algorithm utilizes I-frame, P-frame and B-frame to compress the video raw data. The I-frame is an 'Intra-coded picture', which fully specifies picture, just like a conventional static image file. Therefore, I-frame is the least compressible but does not require other video frames to decode. P-frame holds only the changes in the video from the previous frame. The encoding does not need to store the unchanging information in the P-frame, thus saving space. B-frame saves even more space by using differences between the current frame and both the preceding and following frames to specify its content. Therefore, the P-frame and the B-frame hold only part of the video information, so a P-frame or a B-frame need less space to store than an I-frame, and thus improve video compression rates. However, when decompressing the B-frame, a time for waiting for a following frame is necessary, such that it typically comes at the cost of higher latency. Therefore, the encoding cores 1121-112n do not utilize B-frame to compress the video raw data. Besides, since I-frame is relatively larger in data size, it will occupy a large part of the bandwidth of the network transmission and subsequently lead to a burst of the network transmission, such that the latency is increased. To avoid the burst of I-frame, the encoding cores 1121-112n use gradual Decoder Refresh (GDR) technique to reduce the usage of I-frame. This is achieved by distributing an instantaneous decoder refresh (IDR) frame (which is a kind of I-frame) into multiple P frames. Please refer to FIG. 5, a portion of P frame (e.g. in the center P-frame shown in figure) can be used as an I-frame. Therefore, the decoding side still can derive the information of the I-frame, but the burst of I-frame can be avoided. By adopting such technique, the encoding cores 1121-112n can generate a compressed video stream with a sequence such as "IPPPPPPPPPPPPP . . . ". In view of above, based on the encoding of the encoding cores 1121-112n, the burst of the network transmission due to I-frame can be avoided and the decoding latency due to B-frame can be also avoided, such that the encoding cores 1121-112n cause lower latency than a traditional MPEG-4 encoder. Further, each of the encoding cores 1121-112n has a pipeline architecture, which can accelerate the encoding processing. With the pipeline architecture, each of the encoding cores 1121-112n has to buffer multiple macroblocks. Preferably, each of the encoding cores 1121-112n has a buffer, and the buffer is utilized for storing three continuous macroblocks at a time. Be note that, the number of the macroblocks that are buffered depends on the clock frequency of the encoding cores encoding cores 1121-112n as well as the number of the stages of the pipeline.

The controller 114 performs the DMA function to access at least one macroblock of video raw data from the video RAM 1232 during each data transfer. For multi-channel encoding, the controller 114 accesses macroblocks of different video frames of different game applications from the dedicated segmented area of the video RAM 1232. An interface switch 1130 of the encoder 112 is used to assign the macroblocks to each channel (i.e. encoding cores 1121-112n). The network switch 1120 is used to determine which encoding core 1121-112n is to output the compressed video stream. Then, the network interface 118 packetizes the compressed video stream output by the network switch 1120.

Figure 6:
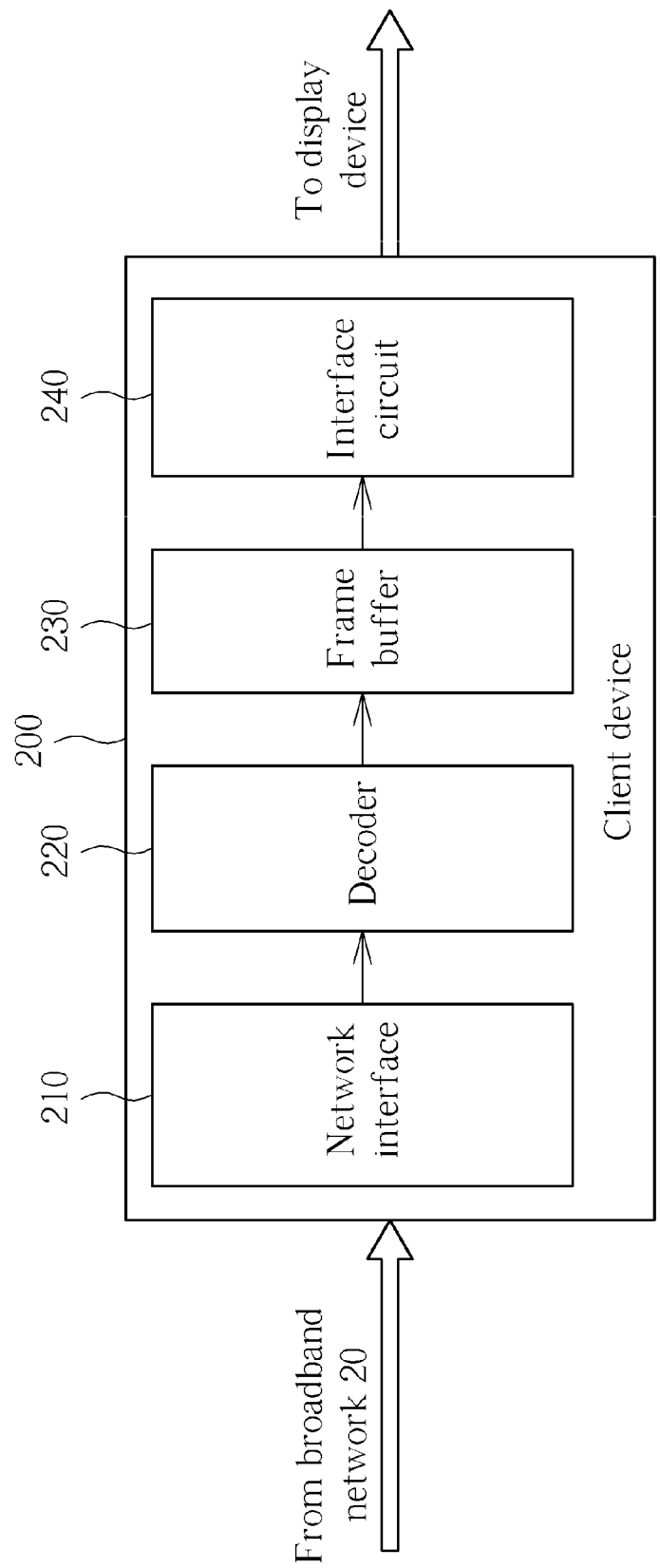
FIG. 6 illustrates a detailed block diagram of the client device shown in FIG. 1 according to one exemplary embodiment to the present invention.

To render the compressed video stream, the client device 200 is provided according to one exemplary embodiment shown in FIG. 6. As shown in FIG. 6, the client device 200 includes a network interface 210 and a decoder 220. The network interface 210 receives the compressed video stream via the broadband network 20. The network interface 210 de-packetizes the TCP or UDP packets to derive the compressed video stream based on TCP or UDP protocols. Accordingly, the decoder 220 decompresses the received compressed video stream to derive a slice of a video frame, wherein the slice comprises at least one macroblock row. The decoder 220 also has a pipeline architecture, and has a buffer for buffering three continuous macroblocks at a time. In accordance with various embodiments of the present invention, the number of the macroblocks that are buffered may be different and depend on the clock frequency and the number of stages of the pipeline architecture of the decoder 220. The decompressed macroblock rows will be buffered in a frame buffer 230 of the client device 200. When all the macroblock rows or slices of a whole video frame are decompressed by the decoder 220, the whole video frame buffered in the frame buffer 230 will be outputted to a display device that is connected to the client device 200 via a display interface 240, wherein the display interface 240 can perform display signaling conversion for providing a suitable display signal to the display device, such as RGB-to-HDMI or MIPI-to-HDMI.

Be note that, the transportation layers of both gaming server 100 and client device 200 need to buffer the compressed video stream. That is, the network interface 118 uses a buffer for buffering the compressed video stream before transferring it over the broadband network 20, wherein three macroblock rows are buffered. Also, the network interface 210 uses a buffer for buffering the compressed video stream before de-packetizing the compressed video and sending the received compressed video stream to the decoder 220 for decompressing, wherein three macroblock rows are buffered. By adopting the buffer in the transportation layer, a back-to-back latency of the cloud gaming system will approximately be 1.1 ms plus 2 slice duration, wherein the slice duration is determined depends on the size of the slice.

Assuming that the game video has the frame rate of 30 fps, and each video frame is segmented as 68 macroblock rows, thus, the processing time for encoding per macroblock row will be 490 us (1/(30*68)). In addition, as the encoding core buffers three macroblock for pipelining, the latency of each encoding core 1121-112n, measured from the input of a scan line to the output of Network Abstraction Layer (NAL) bytes will be 490 us (encoding time) plus latency of buffering the three macroblocks (which is approximately 4 us for each), which is equal to 0.502 ms. Similarly, as the decoder 220 has similar decompression architecture and pipeline architecture, the latency of decoder 220, measured from NAL bye to the output frame buffer, will also be 0.502 ms. Considering the latency of data bus in each side (i.e. encoding side and decoding side), the total latency of the encoding core 1121-112n and the total latency of the decoder 220 will be at most 1 ms, respectively. With such low latency of video compression and video decompression, a system latency, from a user inputs his/her gaming command, to the display of the user-side is refreshed in response to the gaming command, will not exceed 100 ms (taking the latency of the network transmission into consideration), which is suitable for any type of games that needs high gaming response, such as action game, racing game, or sport game.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In view of above, due to the video processing device of the present invention and the related video compression and video decompression techniques used therein, the latency can be effectively reduced. Besides, as the video processing device includes a high speed computer expansion card interface, the video processing device can be easily implemented as a computer expansion card (e.g. PCI-E card) such that the video processing device is highly compatible to any gaming server architecture in the state of the art. Due to the high bandwidth of the computer expansion card interface, it allows the video processing device to perform multi-channel encoding, such that the gaming server of the present invention can support for a variety of client devices and provide the users with high gaming interactivity and fine entertainment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing device, comprising:
an expansion card interface, arranged for providing a multi-channel data transfer;
   a controller, arranged for performing direct memory access (DMA) function to access a video raw data from a video memory via the expansion card interface; and
   an encoder, coupled to the controller, arranged for encoding the video raw data to generate a compressed video stream based on slices,
   wherein each slice comprises at least one macroblock row; wherein the video raw data comprises a plurality of video frames, each video frame is divided into M×N macroblocks, where M and N are both integers, and each macroblock row comprises n macroblocks, where n is at most N, M is total number of rows of macroblocks arranged along horizontal direction parallel to the macroblock row and N is total number of columns of macroblocks arranged along vertical direction for the each video frame, the encoder comprises a plurality of encoding cores, the encoder is arranged for performing multi-channel encoding with the plurality of encoding cores, and each encoding core comprises a buffer for buffering a plurality of continuous macroblocks according to a clock frequency of the encoding core, a latency of the encoding core at least comprises a processing time of encoding one macroblock row and a buffering time of buffering three continuous macroblocks.

2. The video processing device of claim 1, wherein the expansion card interface is a PCI-Express (PCI-E) interface, and the video processing device is a PCI-E card.

3. The video processing device of claim 1, wherein the controller is arranged for performing the DMA function to access at least one macroblock of the video raw data from the video memory during each data transfer.

4. The video processing device of claim 1, wherein the encoder generates the compressed video stream according to Baseline Profile; and the video processing device further comprises a network interface for streaming out the compressed video stream.

5. A video client-server system, comprising:
a video server, comprising:
   a graphic processing unit (GPU), arranged for generating a video raw data;
   a video memory, coupled to the GPU, arranged for storing the video raw data; and
   a video processing device, comprising:
      an expansion card interface, arranged for providing a multi-channel data transfer;
      a controller, arranged for performing direct memory access (DMA) function to access the video raw data from the video memory via the expansion card interface; and
      an encoder, coupled to the controller, arranged for encoding the video raw data to generate a compressed video stream based on slices, wherein each slice comprises at least one macroblock row; and
   wherein the video raw data comprises a plurality of video frame, each video frame is divided into M×N macroblocks, and each macroblock row comprises n macroblocks, where n is at most N, M is total number of rows of macroblocks arranged along horizontal direction parallel to the macroblock row and N is total number of columns of macroblocks arranged along vertical direction for the each video frame, a client device, comprising:
   a decoder, arranged for decoding the compressed video stream to generate a decompressed video data, wherein the decompressed video data comprises a slice of the video frame; and
   a buffer, arranged for buffering a plurality of continuous macroblocks according to a clock frequency of the decoder, wherein the encoder comprises a plurality of encoding cores, the encoder performs multi-channel encoding with the encoding cores, and each encoding core comprises a buffer for buffering a plurality of continuous macroblocks according to a clock frequency of the encoding core; and the decoder comprises a buffer for buffering a plurality of continuous macroblocks according to a clock frequency of the decoder, a latency of the encoding core at least comprises a processing time of encoding one macroblock row and a buffering time of buffering the plurality of continuous macroblocks; and a latency of the decoder at least comprises a processing time of decoding one macroblock row and a buffering time of buffering three continuous macroblocks.

6. The video client-server system of claim 5, wherein the expansion card interface is a PCI-Express (PCI-E) interface and the video processing device is a PCI-E card.

7. The video client-server system of claim 5, wherein the controller is arranged for performing the DMA function to access at least one macroblock of video raw data from the video memory during each data transfer.

8. The video client-server system of claim 5, wherein:
the video processing device comprises a first network interface for streaming out the compressed video stream generated by the encoder; and the client device comprises a second network interface for receiving the compressed video stream to provide the decoder with the received compressed video stream.

* * * * *